United States Patent
Lu et al.

(10) Patent No.: US 10,929,648 B2
(45) Date of Patent: Feb. 23, 2021

(54) APPARATUS AND METHOD FOR DATA PROCESSING

(71) Applicant: FUJITSU LIMITED, Kawasaki (JP)

(72) Inventors: Pingping Lu, Beijing (CN); Rujie Liu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 127 days.

(21) Appl. No.: 16/210,158

(22) Filed: Dec. 5, 2018

(65) Prior Publication Data

US 2019/0171866 A1    Jun. 6, 2019

(30) Foreign Application Priority Data

Dec. 5, 2017    (CN) .......................... 201711267386.2

(51) Int. Cl.
| | |
|---|---|
| *G06K 9/00* | (2006.01) |
| *G06K 9/62* | (2006.01) |
| *G06T 3/00* | (2006.01) |
| *G06N 3/04* | (2006.01) |
| *G06T 7/60* | (2017.01) |

(52) U.S. Cl.
CPC ..... *G06K 9/00281* (2013.01); *G06K 9/00248* (2013.01); *G06K 9/629* (2013.01); *G06N 3/04* (2013.01); *G06T 3/0006* (2013.01); *G06T 7/60* (2013.01); *G06T 2207/20081* (2013.01); *G06T 2207/30201* (2013.01)

(58) Field of Classification Search
CPC combination set(s) only.
See application file for complete search history.

(56) References Cited

U.S. PATENT DOCUMENTS

| | | | | |
|---|---|---|---|---|
| 2015/0179219 | A1* | 6/2015 | Gao | .......... G06T 7/254 386/278 |
| 2015/0279113 | A1* | 10/2015 | Knorr | .......... G06T 7/11 345/633 |
| 2018/0018079 | A1* | 1/2018 | Monastyrshyn | .......... H04N 21/44008 |
| 2019/0098252 | A1* | 3/2019 | Tiger | .......... G06T 7/13 |

* cited by examiner

*Primary Examiner* — Joshua L Schwartz
(74) *Attorney, Agent, or Firm* — Staas & Halsey, LLP (57) ABSTRACT

An apparatus and a method for data processing are provided. The apparatus for data processing includes a modeler configured to build an occlusion object model for an image containing an occlusion object; a renderer configured to render the occlusion object model according to a geometric relationship between the occlusion object and a face image containing no occlusion object, such that the rendered occlusion object image and the face image containing no occlusion object have same scale and attitude; and a merger configured to merge the face image containing no occlusion object and the rendered occlusion object image into an occluded face image. With the data processing apparatus and the data processing method face data enhancement, face data in the case of having an occlusion object is generated, so that the number of face training data sets can be effectively increased, thereby improving performance of a face-related module.

18 Claims, 6 Drawing Sheets

APPARATUS AND METHOD FOR DATA PROCESSING

CROSS REFERENCE

This application claims the benefit and priority of Chinese Application No. 201711267386.2, filed on Dec. 5, 2017, entitled "APPARATUS AND METHOD FOR DATA PROCESSING", the entire disclosure of which is incorporated herein by reference.

FIELD

The present disclosure relates to the technical field of data processing, and in particular to a data processing apparatus and a data processing method for face data enhancement.

BACKGROUND

This part provides background information related to the present disclosure, which is not necessarily the conventional technology.

In order to improve the performance of a face-related module (for example, a module for detection, alignment or identification) in the actual environment, training data sets may be collected according to the actual situation, which requires diversity of the training data for a model. However, the diversity of the training data is usually not be ensured for an existing open data set, particularly for the face data set in the case of being occluded partially for example, by a pair of glasses or face mask. If the face data is recollected according to the application environment and requirements, it is time-consuming and requires the higher labor cost, and the diversity of data set is required for a long time.

Therefore, it is desired to provide a solution for face data enhancement having a low cost and operating easily. In order to solve the above problems, a framework for generating a face occlusion data set at a low cost is provided in the present disclosure, where the occlusion object may be a common type of face occlusion object such as a face mask, a pair of glasses, a hand and a microphone.

SUMMARY

This part provides a general summary of the present disclosure, rather than a complete disclosure of a full scope or all features of the present disclosure.

A data processing apparatus and a data processing method for face data enhancement are provided in the present disclosure, to generate face data in the case of having an occlusion object, so that the number of face training data sets can be effectively increased, thereby improving performance of a face-related module. The data processing apparatus and the data processing method provided in the present disclosure operates easily and have a low calculation amount and a labor cost.

According to an aspect of the present disclosure, a data processing apparatus is provided. The apparatus includes a modeler, a renderer and a merger. The modeler is configured to build an occlusion object model for an image containing an occlusion object. The renderer is configured to render the occlusion object model according to a geometric relationship between the occlusion object and a face image containing no occlusion object, such that the rendered occlusion object image and the face image containing no occlusion object have same scale and attitude. The merger is configured to merge the face image containing no occlusion object and the rendered occlusion object image into an occluded face image.

According to another aspect of the present disclosure, a data processing method is provided. The method includes: building an occlusion object model for an image containing an occlusion object; rendering the occlusion object model according to a geometric relationship between the occlusion object and a face image containing no occlusion object, such that the rendered occlusion object image and the face image containing no occlusion object have same scale and attitude; and merging the face image containing no occlusion object and the rendered occlusion object image into an occluded face image.

According to another aspect of the present disclosure, a program product is provided. The program product includes a machine-readable instruction code stored therein. The instruction code, when read and executed by a computer, enables the computer to implement the data processing method provided in the present disclosure.

According to another aspect of the present disclosure, a machine-readable storage medium is provided, on which the program product provided in the present disclosure is carried.

With the data processing apparatus and the data processing method provided in the present disclosure, face data in the case of having an occlusion object is generated, so that the number of face training data sets can be effectively increased, thereby improving performance of a face-related module. The data processing apparatus and the data processing method provided in the present disclosure operates easily and have a low calculation amount and a labor cost.

From the description herein, further applicability regions are apparent. The description and specific examples in the summary are only for illustrative purposes and are not intended to limit the scope of the present disclosure.

BRIEF DESCRIPTION OF THE DRAWINGS

The drawings described herein are used for illustrating the selected embodiments, rather than all of the possible embodiments, and are not intended to limit the scope of the present disclosure. In the drawings.

Although the present disclosure is susceptible to various modifications and substitutions, specific embodiments of the present disclosure are shown in the drawings as an example and are described in detail herein. However, it should be understood that the description for specific embodiments herein is not intended to limit the present disclosure into a disclosed particular form, but rather, the present disclosure aims to cover all modifications, equivalents and substitutions falling within the spirit and scope of the present disclosure. It should be noted that, throughout the drawings, a numeral indicates a component corresponding to the numeral.

DETAILED DESCRIPTION OF EMBODIMENTS

Examples of the present disclosure are now described more fully with reference to the drawings. The following description is merely exemplary substantively and is not intended to limit the present disclosure and an application or use thereof.

Exemplary embodiments are provided to make the present disclosure thorough and fully convey a scope of the present disclosure to those skilled in the art. Examples of various specific details, such as specific components, apparatuses, and methods, are set forth to provide thorough understanding for the embodiments of the present disclosure. It is apparent for those skilled in the art that the exemplary embodiments may be embodied in multiple different forms without using specific details, and should not be interpreted as limiting the scope of the present disclosure. In some exemplary embodiments, well-known processes, well-known structures, and well-known technology are not described in detail.

Figure 1:
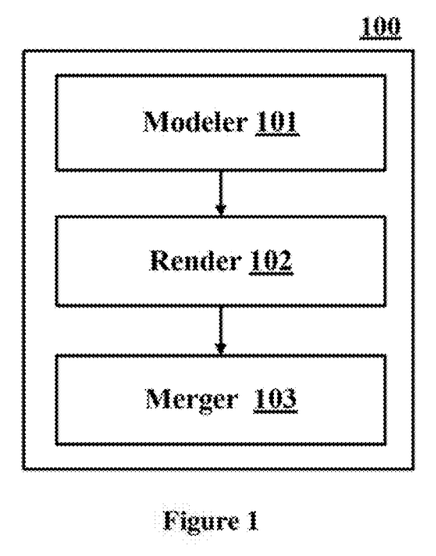
FIG. 1 is a block diagram of a data processing apparatus according to an embodiment of the present disclosure.

FIG. 1 shows a block diagram of a data processing apparatus 100 according to an embodiment of the present disclosure. As shown in FIG. 1, the data processing apparatus 100 according to the embodiment of the present disclosure may include a modeler 101, a renderer 102, and a merger 103.

The modeler 101 may be configured to build an occlusion object model for an image containing an occlusion object.

The renderer 102 may be configured to render the occlusion object model according to a geometric relationship between the occlusion object and a face image containing no occlusion object, such that the rendered occlusion object image and the face image containing no occlusion object have same scale and attitude.

The merger 103 may be configured to merge the face image containing no occlusion object and the rendered occlusion object image into an occluded face image.

With the data processing apparatus provided in the present disclosure, face data in the case of having an occlusion object is generated, so that the number of face training data sets can be effectively increased, thereby improving performance of a face-related module. The data processing apparatus provided in the present disclosure operates easily and have a low calculation amount and a labor cost.

Figure 2A:
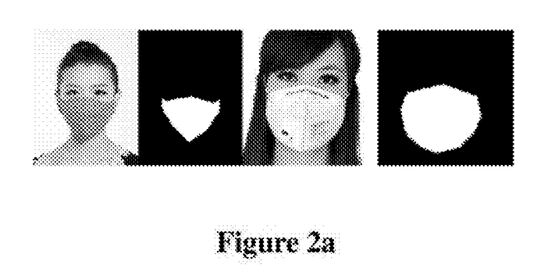
FIG. 2a to FIG. 2c schematically show occlusion objects according to the embodiment of the present disclosure.
Figure 2B:
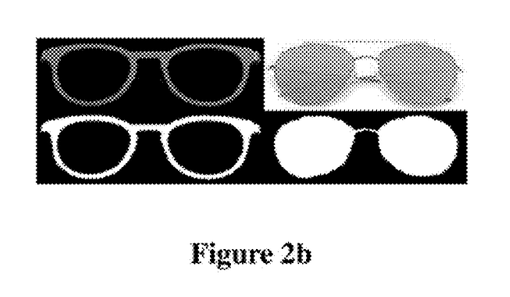
Figure 2C:
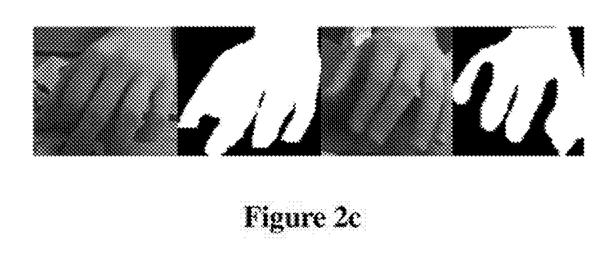

According to an embodiment of the present disclosure, the occlusion objects may include rigid occlusion objects and non-rigid occlusion objects. As shown in FIG. 2a to FIG. 2c, the non-rigid occlusion objects may include an occlusion object of which a border is deformed according to facial contours, such as a respirator and a face mask. The rigid occlusion objects may include an occlusion object of which a border is not deformed according to facial contours, such as a pair of glasses, a microphone and a hand. It should be understood by those skilled in the art that the non-rigid occlusion objects and the rigid occlusion objects are not limited to examples illustrated in the present disclosure.

According to an embodiment of the present disclosure, the data processing apparatus may further include an occlusion object definition unit configured to define a type of the occlusion object. That is, the occlusion object definition unit may define that the occlusion object is a rigid occlusion object or a non-rigid occlusion object.

Embodiment of Non-Rigid Occlusion Object

Figure 3:
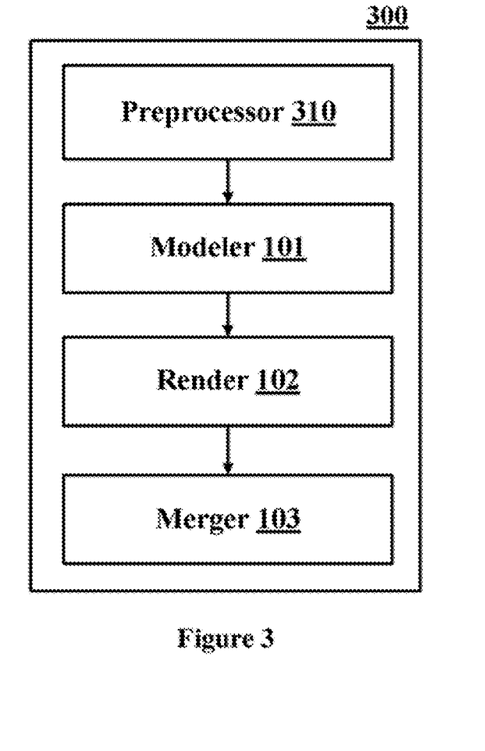
FIG. 3 is a block diagram of a data processing apparatus according to another embodiment of the present disclosure.

According to an embodiment of the present disclosure, some preprocessing may be performed before building a model in order to facilitate subsequent processing. FIG. 3 shows a block diagram of a data processing apparatus 300 according to an embodiment of the present disclosure. As shown in FIG. 3, the data processing apparatus 300 according to the embodiment of the present disclosure may include a preprocessor 310, a modeler 101, a renderer 102 and a merger 103.

According to the present embodiment, the data processing apparatus 300 may further include the preprocessor 310. The preprocessor 310 may be configured to perform preprocessing on a face image containing a non-rigid occlusion object. The preprocessing includes performing face detection and face feature point detection on the face image containing the non-rigid occlusion object.

According to an embodiment of the present disclosure, the face detection and the face feature point detection may be performed automatically or manually. In a case that the face detection and the face feature point detection are performed automatically, the face detection may be performed by using Multi-Task Convolutional Neural Networks (MTCNN) or Normalized Pixel Difference (NPD), and the face feature point detection may be performed by using Deformable Parts Model (DPM) or Convolutional Neural Networks (CNN). It should be understood by those skilled in the art that the face detection and the face feature point detection may be performed by other methods, which are not limited to examples described in the present disclosure. Those skilled in the art may adopt other methods having similar functions in the conventional technology. In a case that the face feature point detection is performed manually, the face feature point may be labeled and stored in advance.

The non-rigid occlusion objects such as a respirator may affect position accuracy of the face feature point. Therefore, according to an embodiment of the present disclosure, the preprocessor 310 may further be configured to modify face feature points in the non-rigid occlusion object by a standard face or average face image.

In order to facilitate the subsequent modeling and the adjustment of color consistency, according to an embodiment of the present disclosure, the preprocessor 310 may further be configured to perform segmentation on the optimized (i.e., modified) face image to obtain a non-rigid occlusion object image. The non-rigid occlusion object image herein includes non-rigid occlusion object regions, i.e., a respirator region and a face region. According to an embodiment of the present disclosure, the segmentation may be performed by manually labeling or by an automatic or semi-automatic method such as a Watershed Method.

Figure 4:
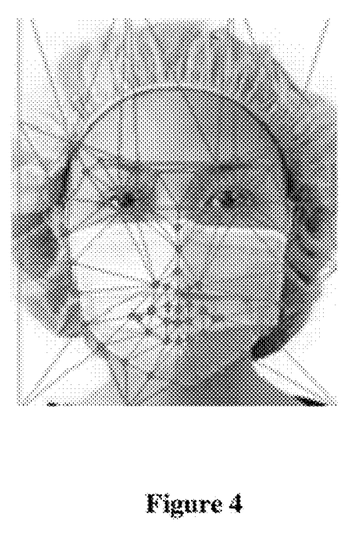
FIG. 4 schematically shows an occlusion object model for a non-rigid occlusion object image according to an embodiment of the present disclosure.

The modeler 101 may be configured to build an occlusion object deformation model for the non-rigid occlusion object image. According to an embodiment of the present disclosure, the modeler 101 may build an occlusion object deformation model for a segmented non-rigid occlusion object image by a Triangulated Irregular Network TIN, as shown in FIG. 4. It should be understood by those skilled in the art that the occlusion object deformation model may be processed by using affine transformation according to actual viewing-angle requirements.

A face image containing no occlusion object is inputted. According to an embodiment of the present disclosure, the preprocessor 310 may be configured to perform preprocessing on the inputted face image containing no occlusion object. The preprocessing may also include performing face detection, face feature point detection and face segmentation, where the face feature point detection includes extracting face feature points. Similarly, the face detection, the face feature point detection and the face segmentation may be performed by adopting the methods in the conventional technology, which are described in the present disclosure. It should be understood by those skilled in the art that other methods having similar functions in the conventional technology than those illustrated in the present disclosure may be adopted.

The renderer 102 may be configured to render the occlusion object model according to a geometric relationship between the non-rigid occlusion object and the inputted face image containing no occlusion object, such that the rendered occlusion object image and the face image containing no occlusion object have same scale and attitude.

According to an embodiment of the present disclosure, the renderer 102 may be configured to construct a Triangulated Irregular Network TIN for the face image containing no occlusion object based on the extracted face feature points and the occlusion object model, where the Triangulated Irregular Network TIN includes multiple triangular faces. Then, the renderer 102 may render, for each of the multiple triangular faces, the occlusion object model by using affine transformation. That is, the renderer 102 may further be configured to transform each of the triangular faces of the occlusion object model into coordinates of the inputted face image containing no occlusion object using the affine transformation.

The merger 103 may be configured to merge the face image containing no occlusion object and the rendered occlusion object image into an occluded face image.

In order to enhance authenticity of the occluded face image merged by the rendered occlusion object image and the face image containing no occlusion object, some post processing is required, rather than only image substituting.

According to an embodiment of the present disclosure, the merger 103 may be configured to control a boundary of a fusion region of the occluded face image to be steadily transited by image mixing such as alpha matting.

In addition, in order to make the fusion region and the inputted face image containing no occlusion object have same illumination condition, according to an embodiment of the present disclosure, the merger 103 may further be configured to control the fusion region of the occluded face image and the face image containing no occlusion object to have same illumination condition by histogram specification. Specifically, the histogram specification is performed on other face regions of the occluded face image than the fusion region and the corresponding region of the inputted face image containing no occlusion object, and an obtained grey level mapping function is applied to a final fusion region.

According to an embodiment of the present disclosure, the data processing apparatus may further include a collector. The collector may be configured to collect a face image containing the non-rigid occlusion object in a front view, for example, a first image and a third image shown in FIG. 2a.

With the data processing apparatus provided in the present disclosure, face data in the case of having an occlusion object is generated, so that the number of face training data sets can be effectively increased, thereby improving performance of a face-related module. The data processing apparatus provided in the present disclosure operates easily and have a low calculation amount and a labor cost.

Embodiment of Rigid Occlusion Object

For a case that the occlusion object is a rigid occlusion object, some preprocessing may also be performed in order to facilitate subsequent processing. With reference to FIG. 3, a data processing apparatus 300 according to an embodiment of the present disclosure may include a preprocessor 310, a modeler 101, a renderer 102 and a merger 103.

According to the present embodiment, the data processing apparatus 300 may further include the preprocessor 310. The preprocessor 310 may be configured to perform preprocessing on an image containing a rigid occlusion object. The preprocessing may include determining scale information, including a centroid, a height and a width, of the rigid occlusion object. It should be understood by those skilled in the art that, the rigid occlusion object may be a non-deformable occlusion object such as a pair of glasses and a microphone, and the scale information of the rigid occlusion object may be determined according to actual situations or requirements, which is not limited to the centroid, the height and the width described in the present disclosure.

In order to facilitate subsequent modeling, according to an embodiment of the present disclosure, the preprocessor 310 may further be configured to perform segmentation on the image containing a rigid occlusion object.

The modeler 101 may be configured to build an occlusion object planar model based on the segmentation result, the position and the scale information of the rigid occlusion object. It should be understood by those skilled in the art that the occlusion object planar model may be processed by using affine transformation according to actual viewing-angle requirements.

A face image containing no occlusion object is inputted. According to an embodiment of the present disclosure, the preprocessor 310 may be configured to perform preprocessing on the inputted face image containing no occlusion object. The preprocessing may also include performing face detection, face feature point detection and face segmentation, where the face feature point detection includes extracting face feature points. Similarly, the face detection, the face feature point detection and the face segmentation may be performed by adopting the methods in the conventional technology which are described in the present disclosure. It should be understood by those skilled in the art that other methods having similar functions in the conventional technology than those illustrated in the present disclosure may be adopted.

In addition, according to an embodiment of the present disclosure, the preprocessor 310 may further be configured to perform attitude estimation on the rigid occlusion object by a simple geometric method.

The renderer 102 may be configured to render the occlusion object model according to a geometric relationship between the rigid occlusion object and the inputted face image containing no occlusion object, such that the rendered occlusion object image and the face image containing no occlusion object have same scale and attitude.

According to an embodiment of the present disclosure, the renderer 102 may be configured to calculate an affine transformation matrix based on information of the rigid occlusion object and information of the face image containing no occlusion object.

For example, in a case that the rigid occlusion object is a pair of glasses, the renderer 102 may be configured to calculate the affine transformation matrix based on a centroid and scale information of the pair of glasses, a central point and a length of two eyes in the inputted face image containing no occlusion object, and the attitude including rotation and translation of the inputted face image containing no occlusion object. In a case that the rigid occlusion object is another occlusion object such as a microphone or a hand, the affine transformation matrix may also be calculated based on the similar parameters such as the centroid and scale information of the occlusion object. In order to ensure the diversity of the generated data set, a position and a viewing-angle of the occlusion object may be generated randomly.

The merger 103 may be configured to merge the face image containing no occlusion object and the rendered occlusion object image into an occluded face image.

According to an embodiment of the present disclosure, the data processing apparatus may further include a collector. The collector may be configured to collect an image of the rigid occlusion object such as a pair of glasses, a microphone and a hand, for example, images shown in FIG. 2b and FIG. 2c. In order to simplify the data enhancement method for the hand and keep the diversity of gestures, an open data set including different gestures, for example, a data set EgoHands may be adopted.

Operations of units similar to those in the above embodiment for the non-rigid occlusion object described in the present disclosure are not repeated herein.

Figure 5:
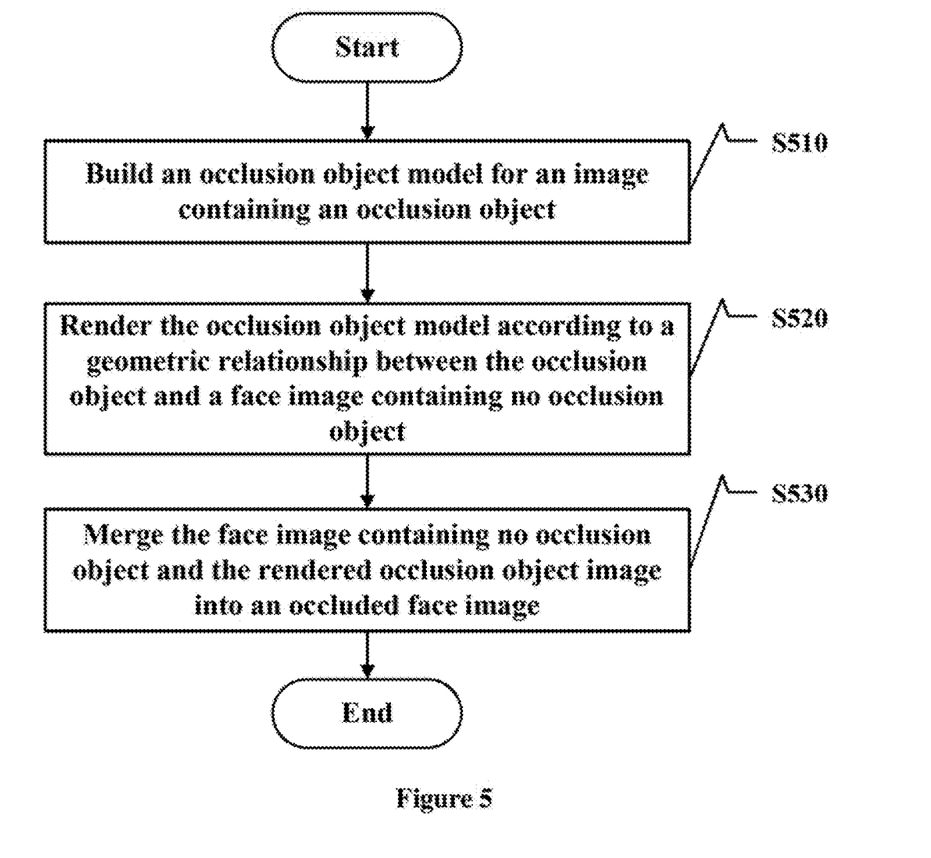
FIG. 5 is a flowchart of a data processing method according to an embodiment of the present disclosure.

A data processing method according to an embodiment of the present disclosure is described below in conjunction with FIG. 5. As shown in FIG. 5, the data processing method according to the embodiment of the present disclosure starts from step S510. In step S510, an occlusion object model is built for an image containing an occlusion object.

Next, in step S520, the occlusion object model is rendered according to a geometric relationship between the occlusion object and a face image containing no occlusion object, such that the rendered occlusion object image and the face image containing no occlusion object have same scale and attitude.

Finally, in step S530, the face image containing no occlusion object and the rendered occlusion object image is merged into an occluded face image.

According to an embodiment of the present disclosure, the data processing method may further include defining a type of the occlusion object. The occlusion object may be defined as a rigid occlusion object or a non-rigid occlusion object.

In a case that the occlusion object is defined as a non-rigid occlusion object, the data processing method may be illustrated as follows.

According to an embodiment of the present disclosure, the data processing method may further include performing first preprocessing on a face image containing a non-rigid occlusion object. The first preprocessing may include performing face detection and face feature point detection on the face image containing the non-rigid occlusion object.

According to an embodiment of the present disclosure, the face detection and the face feature point detection may be performed automatically or manually.

According to an embodiment of the present disclosure, the first preprocessing may further include optimizing face feature points in the non-rigid occlusion object by a standard face or average face image.

According to an embodiment of the present disclosure, the first preprocessing may further include performing segmentation on the optimized face image to obtain a non-rigid occlusion object image.

According to an embodiment of the present disclosure, building an occlusion object model may further include building an occlusion object deformation model for the non-rigid occlusion object image by a Triangulated Irregular Network TIN.

According to an embodiment of the present disclosure, the data processing method may further include performing first preprocessing on a face image containing no occlusion object. The first preprocessing may include performing face detection, face feature point detection and face segmentation. The face feature point detection may include extracting face feature points.

According to an embodiment of the present disclosure, rendering the occlusion object model may include constructing a Triangulated Irregular Network TIN for the face image containing no occlusion object based on the extracted face feature points and the occlusion object model. The Triangulated Irregular Network TIN includes multiple triangular faces.

According to an embodiment of the present disclosure, rendering the occlusion object model may further include rendering, for each of the multiple triangular faces, the occlusion object model by using affine transformation.

According to an embodiment of the present disclosure, merging the face image containing no occlusion object and the rendered occlusion object image into an occluded face image may include controlling a boundary of a fusion region of the occluded face image to be steadily transited by image mixing.

According to an embodiment of the present disclosure, merging the face image containing no occlusion object and the rendered occlusion object image into an occluded face image may further include controlling the fusion region of the occluded face image and the face image containing no occlusion object to have same illumination condition by histogram specification.

According to an embodiment of the present disclosure, the data processing method may further include collecting a face image containing the non-rigid occlusion object in a front view.

In a case that the occlusion object is defined as a rigid occlusion object, the data processing method may be illustrated as follows.

According to an embodiment of the present disclosure, the data processing method may further include performing second preprocessing on an image containing a rigid occlusion object. The second preprocessing may include determining scale information of the rigid occlusion object, including a centroid, a height and a width of the rigid occlusion object.

According to an embodiment of the present disclosure, building an occlusion object model may further include build an occlusion object planar model according to the position and the scale information of the rigid occlusion object.

According to an embodiment of the present disclosure, the second preprocessing may further include performing attitude estimation by a geometric method.

According to an embodiment of the present disclosure, rendering the occlusion object model may further include calculating an affine transformation matrix based on information of the rigid occlusion object and information of the face image containing no occlusion object.

Various specific embodiments of the above steps of the data processing method according to an embodiment of the present disclosure are described above in detail, and are not repeated herein.

It is apparent that various operation procedures of the data processing method according to the present disclosure may be implemented by computer-executable programs stored in various machine-readable storage mediums.

In addition, the object of the present disclosure can also be achieved in the following manner. A storage medium on which the above executable program codes are stored is provided to a system or device directly or indirectly. A computer or a central processing unit (CPU) in the system or in the device reads and executes the above program codes. As long as the system or the device has a function of executing a program, the embodiments of the present disclosure are not limited to the program, and the program may be in any form such as a target program, a program executed by an interpreter or a script program provided to the operating system.

The above machine-readable storage mediums include but are not limited to, various memory and storage units, semiconductor devices, disk units such as an optical disk, a magnetic disk and a magnetic-optical disk, and other mediums suitable for storing information.

In addition, the computer may also implement the technical solution of the present disclosure by connecting to a corresponding website on the Internet, downloading and installing the computer program codes according to the present disclosure to a computer and executing the program codes.

Figure 6:
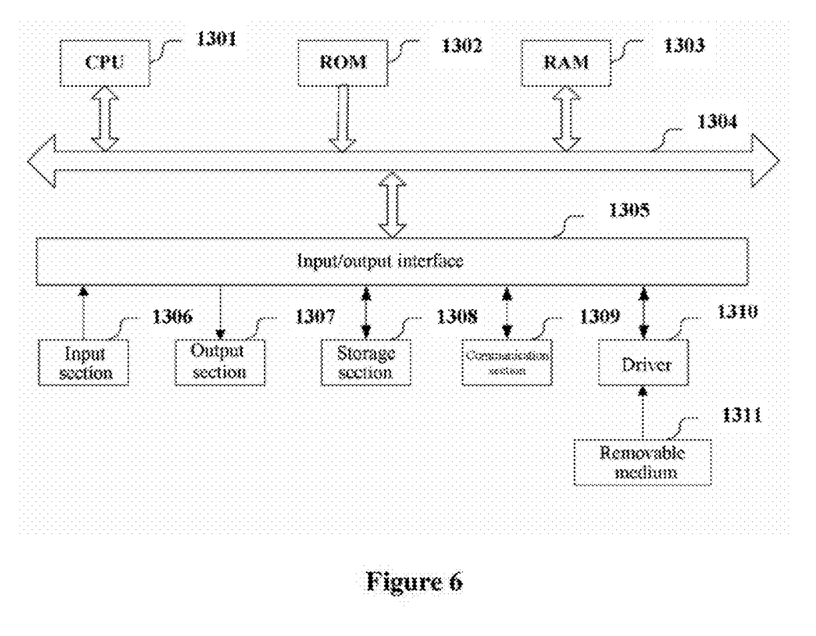
FIG. 6 is a block diagram showing an exemplary structure of a general-purpose personal computer in which an data processing apparatus and an data processing method according to an embodiment of the present disclosure may be implemented.

FIG. 6 is a block diagram showing an exemplary structure of a general purpose personal computer in which an data processing apparatus and an data processing method according to an embodiment of the present disclosure may be implemented.

As shown in FIG. 6, a CPU 1301 performs various types of processing according to programs stored in a read only memory (ROM) 1302 or programs loaded from a storage portion 1308 to a random access memory (RAM) 1303. Data required when the CPU 1301 performs various types of processing is stored in the RAM 1303 as needed. The CPU 1301, the ROM 1302 and the RAM 1303 are connected to each other via a bus 1304. An input/output interface 1305 is also connected to the bus 1304.

The following components are connected to the input/output interface 1305: an input portion 1306 (including a keyboard, and a mouse and so on), an output portion 1307 (including a display, for example a cathode ray tube (CRT) and a liquid crystal display (LCD), and a loudspeaker), a storage portion 1308 (including a hard disk and so on), and a communication portion 1309 (including a network interface card for example a LAN card, and a modem). The communication portion 1309 performs communication processing via a network for example the Internet. A driver 1310 may also be connected to the input/output interface 1305 as needed. A removable medium 1311 such as a magnetic disk, an optical disk, a magnetic-optical disk and a semiconductor memory may be installed on the driver 1310 as needed, such that computer programs read from the removable medium 1311 are installed in the storage portion 1308 as needed.

In a case that the series of processing described above is implemented by software, programs constituting the software are installed from the network for example the Internet or the storage medium for example the removable medium 1311.

Those skilled in the art should understand that the storage medium is not limited to the removable medium 1311 shown in FIG. 6 that stores programs and is distributed separately from the device to provide the programs to the user. Examples of the removable medium 1311 include: a magnetic disk (including a floppy disk (registered trademark), an optical disk (including a compact disk read only memory (CD-ROM) and a digital versatile disk (DVD), a magnetic-optical disk (including a mini disk (MD) (registered trademark)), and a semiconductor memory. Alternatively, the storage medium may be a hard disk included in the ROM 1302 and the storage portion 1308 that stores programs. The storage medium and the device including the storage medium together are distributed to the user.

In the system and method of the present disclosure, it is apparent that various components or steps may be decomposed and/or recombined. These decomposition and/or recombination should be regarded as equivalent solutions of the present disclosure. In addition, the steps performing a series of processing above may be performed in the describing order naturally, but it is not necessary. Some steps may be performed concurrently or independently with each other.

While the embodiments of the present disclosure have been described in detail with reference to the drawings, it should be understood that the above described embodiments are merely used to illustrate the present disclosure and are not intended to limit the disclosure. For those skilled in the art, various modifications and variations may be made on the above described embodiments without departing from the essence and scope of the present disclosure. Accordingly, the scope of the present disclosure is defined only by the appended claims and equivalents thereof.

With respect to embodiments including the above embodiments, the following notes are also disclosed:

Note 1. An apparatus for data processing, including:
a modeler configured to build an occlusion object model for an image containing an occlusion object;
a renderer configured to render the occlusion object model according to a geometric relationship between the occlusion object and a face image containing no occlusion object, such that the rendered occlusion object image and the face image containing no occlusion object have same scale and attitude; and
a merger configured to merge the face image containing no occlusion object and the rendered occlusion object image into an occluded face image.

Note 2. The apparatus according to Note 1, where the occlusion objects include rigid occlusion objects and non-rigid occlusion objects.

Note 3. The apparatus according to Note 2, further including a preprocessor configured to perform first preprocessing on a face image containing a non-rigid occlusion object, the first preprocessing including performing face detection and face feature point detection on the face image containing the non-rigid occlusion object.

Note 4. The apparatus according to Note 3, where the first preprocessing further includes performing the face detection and the face feature point detection automatically or manually.

Note 5. The apparatus according to Note 3, where the first preprocessing further includes optimizing face feature points in the non-rigid occlusion object by a standard face or average face image.

Note 6. The apparatus according to Note 5, where the first preprocessing further includes performing segmentation on the optimized face image, to obtain a non-rigid occlusion object image.

Note 7. The apparatus according to Note 6, where the modeler is further configured to build an occlusion object deformation model for the non-rigid occlusion object image by a Triangulated Network TIN.

Note 8. The apparatus according to Note 2, further including a preprocessor configured to perform first preprocessing on a face image containing no occlusion object, the first preprocessing including performing face detection, face feature point detection and face segmentation, where the face feature point detection includes extracting face feature points.

Note 9. The apparatus according to Note 8, where the renderer is further configured to:

construct a Triangulated Irregular Network TIN for the face image containing no occlusion object based on the extracted face feature points and the occlusion object model, the Triangulated Irregular Network TIN including multiple triangulated faces, and render, for each of the multiple triangular faces, the occlusion object model by using affine transformation.

Note 10. The apparatus according to Note 1, where the merger is further configured to control a boundary of a fusion region of the occluded face image to be steadily transited by image mixing.

Note 11. The apparatus according to Note 10, where the merger is further configured to control the fusion region of the occluded face image and the face image containing no occlusion object to have same illumination condition by histogram specification.

Note 12. The apparatus according to Note 2, further including a preprocessor configured to perform second preprocessing on an image containing a rigid occlusion object, the second preprocessing including determining scale information, including a centroid, a height and a width, of the rigid occlusion object.

Note 13. The apparatus according to Note 12, where the modeler is further configured to build an occlusion object planar model according to the position and the scale information of the rigid occlusion object.

Note 14. The apparatus according to Note 8, where the first preprocessing further includes performing attitude estimation by a geometric method.

Note 15. The apparatus according to Note 2, where the renderer is further configured to calculate an affine transformation matrix based on information of the rigid occlusion object and information of the face image containing no occlusion object.

Note 16. The apparatus according to Note 2, further including a collector configured to collect a face image containing the non-rigid occlusion object in a front view.

Note 17. A method for data processing, including:

building an occlusion object model for an image containing an occlusion object;

rendering the occlusion object model according to a geometric relationship between the occlusion object and a face image containing no occlusion object, such that the rendered occlusion object image and the face image containing no occlusion object have same scale and attitude; and merging the face image containing no occlusion object and the rendered occlusion object image into an occluded face image.

Note 18. The method according to Note 17, where the occlusion objects include rigid occlusion objects and non-rigid occlusion objects.

Note 19. The method according to Note 18, further including performing first preprocessing on a face image containing a non-rigid occlusion object, the first preprocessing including performing face detection and face feature point detection on the face image containing the non-rigid occlusion object.

Note 20. A program product including a machine-readable instruction code stored therein, where the instruction code, when read and executed by a computer, enables the computer to implement the method according to any one of Notes 17 to 19.

The invention claimed is:

1. An apparatus for data processing, including:

a memory, and a processor coupled to the memory to implement, a modeler used to build an occlusion object model for an image containing an occlusion object;

a renderer used to render the occlusion object model according to a geometric relationship between the occlusion object and a face image containing no occlusion object, such that the rendered occlusion object image and the face image containing no occlusion object have same scale and attitude; and a merge used to merge the face image containing no occlusion object and the rendered occlusion object image into an occluded face image, wherein the processer is to further implement a preprocessor used to perform first preprocessing on the face image containing no occlusion object, the first preprocessing including performing face detection, face feature point detection and face segmentation, wherein the face feature point detection includes extracting face feature points, and wherein the renderer is further used to:

construct a Triangulated Irregular Network (TIN) for the face image containing no occlusion object based on the extracted face feature points and the occlusion object model, the TIN including multiple triangulated faces, and render, for each of the multiple triangular faces, the occlusion object model by using affine transformation.

2. The apparatus according to claim 1, wherein the occlusion object include a rigid occlusion object or a non-rigid occlusion object.

3. The apparatus according to claim 2, wherein the preprocessor is further used to perform second preprocessing on a face image containing the non-rigid occlusion object, the second preprocessing including performing face detection and face feature point detection on the face image containing the non-rigid occlusion object.

4. The apparatus according to claim 3, wherein the second preprocessing further includes performing the face detection and the face feature point detection automatically or manually.

5. The apparatus according to claim 3, wherein the first second preprocessing further includes optimizing face feature points in the non-rigid occlusion object by a standard face or average face image.

6. The apparatus according to claim 5, wherein the second preprocessing further includes performing segmentation on the optimized face image, to obtain a non-rigid occlusion object image.

7. The apparatus according to claim 6, wherein the modeler is further used build an occlusion object deformation model for the non-rigid occlusion object image by a Triangulated Irregular Network TIN.

8. The apparatus according to claim 1, wherein the merger is further used to control a boundary of a fusion region of the occluded face image to be steadily transited by image mixing.

9. The apparatus according to claim 8, wherein the merger is further used control the fusion region of the occluded face image and the face image containing no occlusion object to have same illumination condition by histogram specification.

10. The apparatus according to claim 2, wherein the preprocessor is further used to perform third preprocessing on an image containing the rigid occlusion object, the third preprocessing including determining scale information including a centroid, a height and a width, of the rigid occlusion object.

11. The apparatus according to claim 10, wherein the modeler is further used to build an occlusion object planar model according to the position and the scale information of the rigid occlusion object.

12. The apparatus according to claim 1, wherein the first preprocessing further includes performing attitude estimation by a geometric method.

13. The apparatus according to claim 2, wherein the renderer is further used to calculate an affine transformation matrix based on information of the rigid occlusion object and information of the face image containing no occlusion object.

14. The apparatus according to claim 2, the processor is to further implement a collector used to collect a face image containing the non-rigid occlusion object in a front view.

15. A method for data processing by an apparatus including a memory and a processor coupled to the memory, the method including:
  building an occlusion object model for an image containing an occlusion object;
  rendering the occlusion object model according to a geometric relationship between the occlusion object and a face image containing no occlusion object, such that the rendered occlusion object image and the face image containing no occlusion object have same scale and attitude; and
  merging the face image containing no occlusion object and the rendered occlusion object image into an occluded face image,
  wherein the rendering the occlusion object model further includes,
    performing a first preprocessing on the face image containing no occlusion object, the first preprocessing including performing face detection, face feature point detection and face segmentation, wherein the face feature point detection includes extracting face feature points,
    constructing a Triangulated Irregular Network (TIN) for the face image containing no occlusion object based on the extracted face feature points and the occlusion object model, the TIN including multiple triangulated faces, and
    performing the rendering the occlusion object by using affine transformation, for each of the multiple triangular faces.

16. The method according to claim 15, wherein the occlusion object include a rigid occlusion object and a non-rigid occlusion object.

17. The method according to claim 16, further including performing second preprocessing on a face image containing the non-rigid occlusion object, the second preprocessing including performing face detection and face feature point detection on the face image containing the non-rigid occlusion object.

18. A non-transitory machine-readable storage medium to store instruction codes, which when read and executed by a computer, enables the computer to implement:
  building an occlusion object model for an image containing an occlusion object;
  rendering the occlusion object model according to a geometric relationship between the occlusion object and a face image containing no occlusion object, such that the rendered occlusion object image and the face image containing no occlusion object have same scale and attitude; and
  merging the face image containing no occlusion object and the rendered occlusion object image into an occluded face image,
  wherein the rendering the occlusion object model further includes,
    performing a first preprocessing on the face image containing no occlusion object, the first preprocessing including performing face detection, face feature point detection and face segmentation, wherein the face feature point detection includes extracting face feature points,
    constructing a Triangulated Irregular Network (TIN) for the face image containing no occlusion object based on the extracted face feature points and the occlusion object model, the TIN including multiple triangulated faces, and
    performing the rendering the occlusion object by using affine transformation, for each of the multiple triangular faces.

* * * * *